Figure 1:
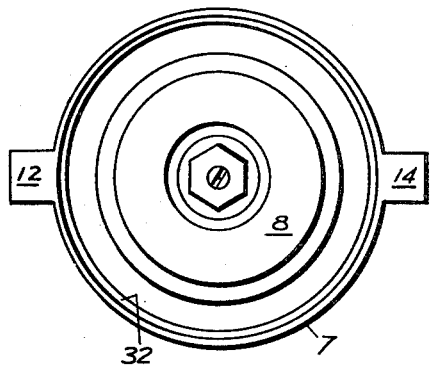

Dec. 10, 1957 A. E. WALDSTEIN 2,815,667
RATE GYROSCOPES
Filed Jan. 28, 1954

INVENTOR
ALBERT E. WALDSTEIN
BY Elmer J. Gorin
ATTORNEY

United States Patent Office 2,815,667
Patented Dec. 10, 1957

2,815,667

RATE GYROSCOPES

Albert E. Waldstein, Arlington, Mass., assignor to Raytheon Manufacturing Company, Waltham, Mass., a corporation of Delaware Application January 28, 1954, Serial No. 406,868

8 Claims. (Cl. 74—5)

This invention relates to rate gyroscopes, and more particularly to miniaturized gyroscopes adapted for use in missile guiding systems and similar applications where space, weight, and moment of inertia values are of paramount importance.

For missile control, automatic piloting, and similar services, it has become common to employ rate gyroscopes whose deflection, commonly termed "precession," about at least one axis (usually the main gimbal bearing axis), is restrained by biasing means which permit limited deflection whose magnitude constitutes a measurement of the rate of change in some characteristic of a missile target, or other subject of control, with respect to the desired value of such characteristic, suitable means being associated with the gyroscope to transmit a signal to deviation responsive servomechanism in accordance with the gyroscopic deflection.

Where such a rate gyroscope is incorporated in a missile or other device having small dimensions, great speed, high vibrational periodicity, or high oscillation frequency inherent therein, it is most desirable that the size, weight and moment of inertia of the gyroscope, particularly the gimbal frame and bearing assembly, be kept as small as possible. Smallness of size is essential especially in missiles and pilotless craft, as a major objective in the design of such devices is the attainment of a high ratio of power plant space to control mechanism space, to the end that the missile or analogous device may sustain itself upon a dictated course for as long a period as possible, thus increasing the likelihood of its reaching its intended target, or destination.

By the same token, smallness of weight and of moment of inertia are highly desirable, not only because such weight savings can be converted into useful additions to the fuel supply, or to the "pay load," but also because a low moment of inertia makes possible the attainment of a high degree of sensitivity and a corresponding reduction in the time lag between signal pickup and gyroscopic response to the signal. This is particularly important where the device to be controlled possesses a high natural frequency of oscillation, whether by reason of its contour, its power plant characteristics, its reaction to flight conditions or a combination of these factors.

The present invention provides a gyroscope of miniature dimensions, and whose component parts are constructed and interrelated in a manner to assure the attainment of the above-described high degree of sensitivity and alacrity of response, while at the same time lending themselves to assembly in miniature sizes, and by the use of a minimum number of assembly tools and assembly operations, the number of individual parts being also minimized.

More particularly, the invention as herein described and illustrated provides a miniature gyroscope in which the main gimbal assembly is composed of complementary hollow hemispheres having nesting circular edges and diametrically opposed, semicylindrical radial extensions, or trunnions, whose flat sides are adapted to abut in a common diametral plane containing the axis about which the gimbal assembly is constrained to turn as deflecting forces are applied, the mating semicylindrical trunnions being secured in assembled relationship by encompassing their respective semicylindrical side surfaces within cups of heated metallic material having the property of contracting to a smaller contour as the said cups cool to the ambient temperature, thereby producing a firm clamping retention of the enclosed gimbal trunnions so that the gimbal components are securely united without resort to the conventional screw types of fastening, and with an important reduction in the total number of assembly-producing parts, as well as in the number of operational steps required to complete the assembly.

The total number of assembling steps is further reduced by integrating the resilient biasing means with one of the two diametrically opposed encompassing cups above described. To this end the said biasing means is herein shown as embodied in a torsion bar of suitable resilient metal, one end of the bar being adapted for attachment to the usual fixed point on a supporting base or frame, and the entire bar being formed as an integral extension of the said encompassing cup. The oppositely disposed encompassing cup likewise has an integral extension serving as the means for reception of a ball-bearing assembly or equivalent means for permitting free turning motion of the gimbal assembly to the extent dictated by successively received deflection impulses, and subject to the yielding opposition of the torsion bar above described.

From the foregoing explanation, particularly as supplemented by the following detailed description of the invention embodiment illustrated in the accompanying drawings, it will be apparent that the invention also embraces the described novel method of constructing and assembling a rate gyroscope of the miniature class, as well as the resulting gyroscope and gyroscope components.

In the drawings:

Fig. 1 is a top plan view of a gyroscope embodying the invention; and

Figure 2:
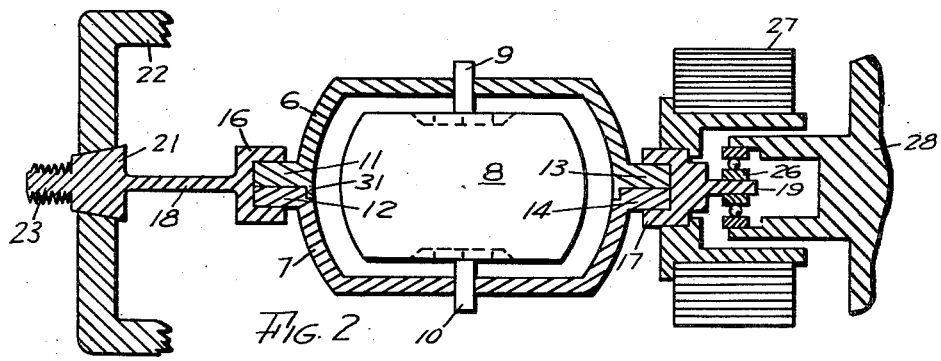
Figure 3:
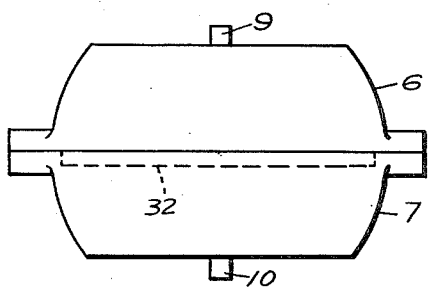
Figure 4:
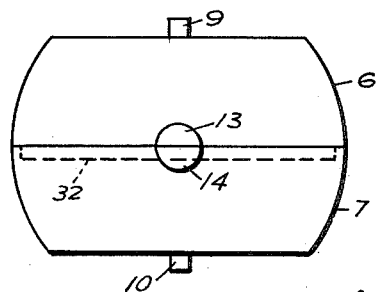

Figs. 2, 3, and 4 are vertical sectional, side elevation, and end elevation views of said gyroscope, certain parts being omitted in Figs. 1, 3, and 4.

In the drawings reference numerals 6 and 7 designate the two complementary halves of the gimbal housing; 8 designates the rotor; 9 and 10 the rotor spindle ends secured to the opposite straight sides of the gimbal housing; 11 and 12, the mating halves of one of the two above-described trunnions; and 13 and 14, the mating halves of the other trunnion. The above-described encompassing cups are shown at 16 and 17, with the torsion bar 18 integrated with cup 16 and stub shaft 19 integrated with cup 17. Bar 18 has a tapered bulge 21 for registry with a correspondingly tapered hole in a bracket or frame 22, and a threaded end 23 for reception of a retaining nut (not shown). A ball-bearing assembly 26 surrounds shaft 19, and an electromagnetic rotor assembly 27 surrounds cup 17, said assembly 27 being part of the subject matter of a copending patent application owned by the assignee of the present invention, and being illustrated herein only as an example of a practical application of the present invention, not an essential part of the invention, per se. The same is true of the socketed element 28 in which the outer race of bearing assembly 26 is retained.

It will be noted that shrink-fitted cups 16 and 17 not only serve to unite the torsion bar and stub shaft to the gimbal housing, but also serve to hold together the two complementary halves of the gimbal housing. Circular lip 31, registering with the correspondingly contoured ledge 32, facilitates such assembly and retention.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. The method of constructing and assembling a rate gyroscope having a gimbal housing, a pivot shaft, and a biasing element, which comprises forming the gimbal housing of complementary halves having diametrically disposed extensions, causing the biasing element to be heated, applying said biasing element to one of said extensions to encompass said extension and contract thereagainst as it cools to the ambient temperature, and causing said pivot shaft to be heated and applied in similar fashion to the other of said extensions.

2. The method of constructing and assembling a rate gyroscope having a gimbal housing and a biasing element, which comprises forming the gimbal housing of complementary halves having mating extensions, heating the biasing element, and applying said biasing element to encompass said extensions and contract thereagainst as it cools to the ambient temperature.

3. A gyroscope including complementary gimbal elements having mating diametrically disposed extensions which combine to form radial projections of relatively small diameter, a torsion bar having its longitudinal axis aligned with said radial projections, and having a terminal cup encompassing and integrated with one of said radial projections, and rotation facilitating means integrated with the other of said radial projections.

4. In the gyroscope defined in claim 3, a circular lip formed on one of said gimbal elements, and a mating circular depression on the other of said gimbal elements, said lip and depression being urged into tight inter-engagement as said torsion bar and rotation facilitating means are integrated with said extensions.

5. A gyroscope including complementary gimbal elements having mating diametrically disposed extensions, a resilient biasing means having a terminal cup integrated with one of said extensions, and rotation facilitating means having a terminal cup integrated with the other of said extensions, said two cups constituting the sole means for retaining said gimbal elements in complementary relationship.

6. A gyroscope including a gimbal element having a radial extension, and a torsion bar having anchoring means at one end and a gimbal-engaging socket at its other end, said socket being adapted to encompass said radial extension and adhere thereto.

7. A gyroscope including a gimbal element having a radial extension, and a torsion bar having anchoring means at one end and a gimbal-engaging socket at its other end, said socket being fitted over said radial extension while in a heated condition, and retained thereon by contraction thereagainst as cooling progresses.

8. The method of constructing and assembling a gyroscope having a gimbal housing which comprises forming the gimbal housing of complementary halves having aligned extensions, encompassing said extensions with pre-heated supporting cups, and causing said supporting cups to cool while in their encompassing positions, to establish permanent shrink-fitted engagement with said extensions.

References Cited in the file of this patent

UNITED STATES PATENTS

| 1,312,085 | Sperry | Aug. 5, 1919 |
| 1,324,478 | Tanner | Dec. 9, 1919 |
| 1,330,503 | Thompson | Feb. 10, 1920 |
| 2,484,823 | Hammond | Oct. 18, 1949 |
| 2,731,836 | Wendt | Jan. 24, 1956 |

FOREIGN PATENTS

| 672,551 | France | Apr. 4, 1929 |
| 368,310 | Great Britain | Mar. 3, 1932 |